Figure 1:
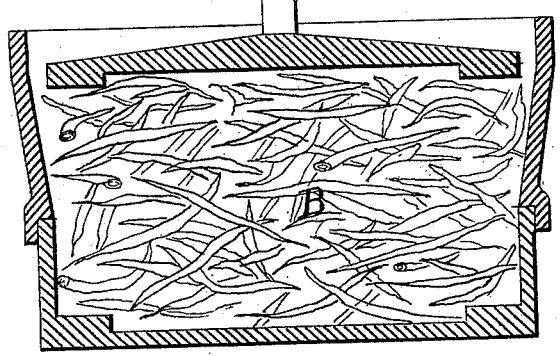

(Specimens.)

W. STANLEY, Jr.
SECONDARY BATTERY.

No. 299,178. Patented May 27, 1884.

Witnesses:
Harry Orrington
John S. Derby

Inventor
William Stanley Jr.
by Clarkson A. Collins
his attorney

UNITED STATES PATENT OFFICE.

WILLIAM STANLEY, JR., OF ENGLEWOOD, NEW JERSEY.

SECONDARY BATTERY.

SPECIFICATION forming part of Letters Patent No. 299,178, dated May 27, 1884.

Application filed August 22, 1883. (Specimens.)

*To all whom it may concern:*

Be it known that I, WILLIAM STANLEY, Jr., a citizen of the United States, and a resident of Englewood, in the county of Bergen and State of New Jersey, have invented certain new and useful Improvements in Secondary Batteries, of which the following is a full and exact specification.

My invention relates to the plates or electrodes of secondary batteries; and the object of my improvements is to provide for such batteries plates or electrodes that shall be light and porous and easily and quickly charged with oxygen or hydrogen, as the case may be, and at the same time shall be so strong and cohesive as not to be liable to disintegration during the operation of the battery. This object I accomplish by constructing my electrodes in the following manner: I have found that when melted lead is poured into cold water from such a height that it will fall in a continuous stream, and at a temperature only slightly above the melting-point of lead, it forms into small tubes of about the diameter of a lead-pencil, and varying in length from one to several inches. I compress a suitable quantity of these tubes into a plate of the size and shape desired for the battery element. The plates are not so far compressed as to entirely close the holes in the tubes or the interstices between them and form a solid plate, but are left porous, so that the electrolyte and the gases set free may have free passage both through the tubes forming the plates and through the interstices between them. A strip around the edge of the plate is still further compressed, so as to make a rim or binding of solid lead, and to this on one side are welded strips of lead, A A, to which the conducting-wires are attached. Plates thus constructed are extremely light and porous, and offer a very great surface to the action of the gases liberated in charging the battery. The plates may be charged with oxygen and hydrogen in the ordinary manner by passing a current of electricity through them while immersed in an electrolyte of dilute sulphuric acid. The leaden tubes, which form the plates, become interlaced and twisted in and out before and during the compression of the plate, and by their binding effect one upon another prevent the warping of the plates and the falling off of the active material which usually occurs during the operation of the battery, especially after it has been charged and discharged a number of times. In charging the battery the tubes forming the positive or oxygen plate are not peroxidized throughout, but only partially, so that a delicate skeleton of metallic lead is left throughout the plate, and a more perfect electrical connection is made than where finely porous or granular lead or lead oxide is pressed upon a supporting-frame or inclosed in a sack or equivalent device, or where thin sheets of lead are peroxidized throughout.

Figure 2:
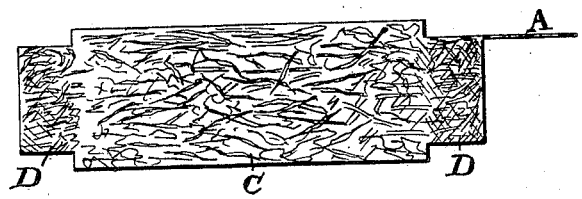
Figure 3:
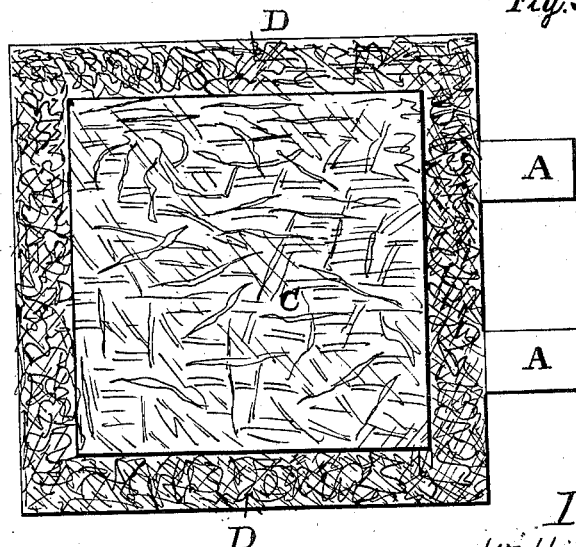

In the drawings, Figure 1 is a cross-section showing the manner of compressing the tubes. Fig. 2 is a side view of the compressed plate, and Fig. 3 is a plan of the same.

B represents the tubes of lead ready for compression; C, the compressed plate, and D the solidly-compressed rim or border. This may be compressed after or by using a suitable die, like that shown in Fig. 1 of the drawings, at the same time with the body of the plate.

I am aware that battery-plates have heretofore been made of certain forms of lead, produced by pouring molten lead into water or into powdered chalk or lime, or by blowing air through it, such as the flaky or arborescent lead described in Letters Patent of the United States Nos. 267,860 and 274,292; and I do not claim such as a part of my invention.

What I do claim as new, and desire to secure by Letters Patent, is—

An electrode or element for secondary batteries, consisting, primarily, of tubes or hollow scraps of lead pressed together to form a plate, substantially as and for the purposes set forth.

WILLIAM STANLEY, JR.

In presence of—
JOHN S. DERBY,
HARRY OVERINGTON.